(12) United States Patent
Saeki (10) Patent No.: US 10,474,912 B2
(45) Date of Patent: Nov. 12, 2019

(54) VEHICLE DISPLAY CONTROLLER, VEHICLE DISPLAY SYSTEM, VEHICLE DISPLAY CONTROL METHOD, AND NON-TRANSITORY STORAGE MEDIUM

(71) Applicant: JVC KENWOOD Corporation, Yokohama-shi, Kanagawa (JP)

(72) Inventor: Izumi Saeki, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 16/151,364

(22) Filed: Oct. 4, 2018

(65) Prior Publication Data

US 2019/0122058 A1 Apr. 25, 2019

(30) Foreign Application Priority Data

Oct. 25, 2017 (JP) .................................. 2017-206153

(51) Int. Cl.
| | |
|---|---|
| *G06K 9/00* | (2006.01) |
| *G02B 27/01* | (2006.01) |
| *B60R 1/02* | (2006.01) |
| *B60R 1/00* | (2006.01) |
| *B60K 35/00* | (2006.01) |
| *B60R 1/10* | (2006.01) |

(52) U.S. Cl.
CPC .......... *G06K 9/00818* (2013.01); *B60K 35/00* (2013.01); *B60R 1/00* (2013.01); *B60R 1/006* (2013.01); *B60R 1/02* (2013.01); *B60R 1/10* (2013.01); *G02B 27/0101* (2013.01); *B60K 2370/52* (2019.05); *B60R 2300/105* (2013.01); *B60R 2300/30* (2013.01); *G02B 2027/014* (2013.01)

(58) Field of Classification Search
CPC combination set(s) only.
See application file for complete search history.

(56) References Cited

U.S. PATENT DOCUMENTS 6,801,638 B1 * 10/2004 Janssen .................. B60K 35/00
                                                            382/104
9,767,371 B2 * 9/2017 Ai ............................. G06K 9/66
(Continued)

FOREIGN PATENT DOCUMENTS

JP 2005-106722 4/2005

*Primary Examiner* — Travis R Hunnings
(74) *Attorney, Agent, or Firm* — Amin, Turocy & Watson LLP (57) ABSTRACT

A vehicle display controller includes a video data acquisition unit that acquires first video data of a rear side of a vehicle, a positional relationship acquisition unit that acquires a positional relationship between a guide sign on a traveling course of the vehicle and the vehicle, a guide sign information acquisition unit that acquires an indication on the guide sign, a recognition processor that recognizes, after the positional relationship indicates that the vehicle has passed the guide sign, a back surface of the passed guide sign in the first video data, a combination processor that generates a combined video obtaining by combining the indication on the guide sign with the back surface of the passed guide sign, and a display controller that causes the combined video to be displayed on a display that is used to check the rear side of the vehicle.

10 Claims, 10 Drawing Sheets

(56) References Cited

U.S. PATENT DOCUMENTS

| | | | |
|---|---|---|---|
| 2015/0181175 A1* | 6/2015 | Camilleri | B60R 1/00 348/148 |
| 2015/0220796 A1* | 8/2015 | Yokoi | B60R 1/00 348/148 |
| 2015/0357767 A1* | 12/2015 | Kageta | H04N 7/183 439/620.22 |
| 2018/0354423 A1* | 12/2018 | Baur | B60R 1/00 |

* cited by examiner

VEHICLE DISPLAY CONTROLLER, VEHICLE DISPLAY SYSTEM, VEHICLE DISPLAY CONTROL METHOD, AND NON-TRANSITORY STORAGE MEDIUM

CROSS-REFERENCE TO RELATED APPLICATION

The present application claims priority to and incorporates by reference the entire contents of Japanese Patent Application No. 2017-206153 filed in Japan on Oct. 25, 2017.

FIELD

The present application relates to a vehicle display controller, a vehicle display system, a vehicle display control method, and a non-transitory storage medium.

BACKGROUND

There is known a technique for recognizing a guide sign or the like in a captured video for a traveling direction of a vehicle to display the guide sign or the like on a display provided in the vehicle. However, when a driver wants to recheck an indication on the guide sign after the vehicle has passed the guide sign, operation by the driver may become necessary.

There is known a navigation device that displays, after the vehicle has passed an installation location of a guide sign, an image of the passed guide sign (for example, see JP 2005-106722 A).

According to the technique described in JP 2005-106722 A, the image of the passed guide sign is displayed on the navigation device. Accordingly, it may be difficult for a driver who is not familiar with the navigation device to judge whether the passed guide sign is displayed or a directional sign at an intersection or the like which is to be crossed is displayed.

SUMMARY

A vehicle display controller, a vehicle display system, a vehicle display control method, and a non-transitory storage medium are disclosed.

According to one aspect, there is provided a vehicle display controller comprising: a video data acquisition unit configured to acquire first video data obtained by capturing a rear side of a vehicle; a positional relationship acquisition unit configured to acquire a positional relationship between a guide sign on a traveling course of the vehicle and the vehicle; a guide sign information acquisition unit configured to acquire an indication on the guide sign; a recognition processor configured to recognize, after the positional relationship between the guide sign and the vehicle acquired by the positional relationship acquisition unit indicates that the vehicle has passed the guide sign, a back surface of the passed guide sign in the first video data; a combination processor configured to generate, with respect to the first video data, a combined video by combining the indication on the guide sign acquired by the guide sign information acquisition unit with the back surface of the passed guide sign recognized by the recognition processor; and a display controller configured to cause the combined video combined by the combination processor to be displayed on a display that is used to check the rear side of the vehicle.

According to one aspect, there is provided a vehicle display control method comprising: acquiring first video data obtained by capturing a rear side of a vehicle; acquiring a positional relationship between a guide sign on a traveling course of the vehicle and the vehicle; acquiring an indication on the guide sign; recognizing, after the acquired positional relationship between the guide sign and the vehicle indicates that the vehicle has passed the guide sign, a back surface of the passed guide sign in the first video data; generating, with respect to the first video data, a combined video by combining the acquired indication on the guide sign with the recognized back surface of the guide sign; and causing the combined video to be displayed on a display that is used to check the rear side of the vehicle.

According to one aspect, there is provided a non-transitory storage medium that stores a program for causing a computer that operates as a vehicle display controller to execute: acquiring first video data obtained by capturing a rear side of a vehicle; acquiring a positional relationship between a guide sign on a traveling course of the vehicle and the vehicle; acquiring an indication on the guide sign; recognizing, after the acquired positional relationship between the guide sign and the vehicle indicates that the vehicle has passed the guide sign, a back surface of the passed guide sign in the first video data; generating, with respect to the first video data, a combined video by combining the acquired indication on the guide sign with the recognized back surface of the guide sign; and causing the combined video to be displayed on a display that is used to check the rear side of the vehicle.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Hereinafter, embodiments of a vehicle display controller 10, a vehicle display system 1, a vehicle display control method, and a non-transitory storage medium according to the present application will be described in detail. Note that the present application is not limited to the following embodiments.

First Embodiment

Figure 1:
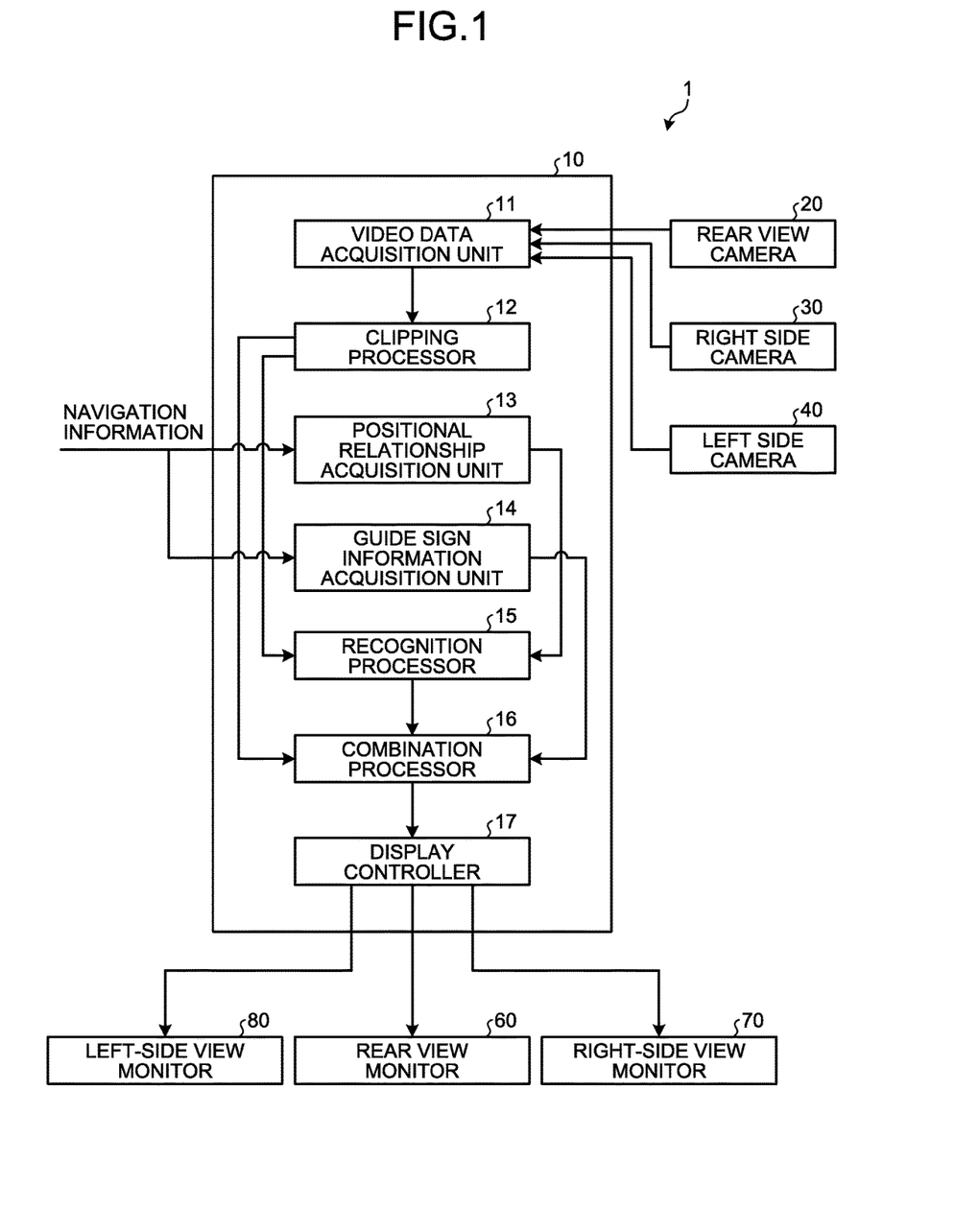
FIG. 1 is a block diagram illustrating an example configuration of a vehicle display system according to a first embodiment.
Figure 2:
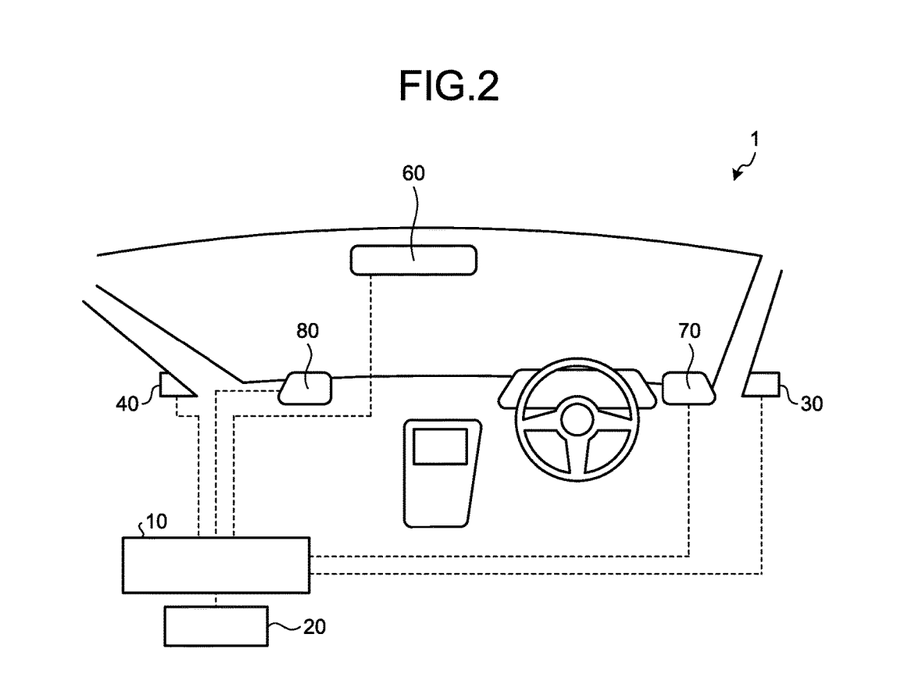
FIG. 2 is a schematic diagram illustrating an example configuration of the vehicle display system according to the first embodiment.

The vehicle display system 1 displays, after the vehicle has passed a guide sign, combined video data 120 obtained by combining an indication on the guide sign with video data on a display for checking a rear side of a vehicle. FIG. 1 is a block diagram illustrating an example configuration of the vehicle display system according to the first embodiment. FIG. 2 is a schematic diagram illustrating an example configuration of the vehicle display system according to the first embodiment.

A guide sign is a plate-shaped marking installed above a road surface of a traveling course of vehicles. For example, the guide sign may be a road sign such as a directional sign, a sign other than road signs, a variable-message sign, an information board, an information display board, or a signboard. The guide sign may be an electronic message board. The guide sign is installed within a range that can be seen from a driver of a vehicle traveling on a traveling course. The guide sign is installed over a traveling course of vehicles or on a side of the traveling course.

As illustrated in FIGS. 1 and 2, the vehicle display system 1 includes a vehicle display controller 10, a rear view camera (imager) 20, a right side camera (imager) 30, a left side camera (imager) 40, a rear view monitor (display) 60, a right-side view monitor (display) 70, and a left-side view monitor (display) 80. The vehicle display system 1 displays combined video data that is obtained by combining an indication on a guide sign with video data, on the rear view monitor 60, the right-side view monitor 70 or the left-side view monitor 80, after the vehicle has passed the guide sign. In the present embodiment, a description is given assuming that the vehicle display system 1 displays combined video data 120 (see FIG. 5) that is obtained by combining an indication on a guide sign with video data on the rear view monitor 60 after the vehicle has passed the guide sign.

Figure 3:
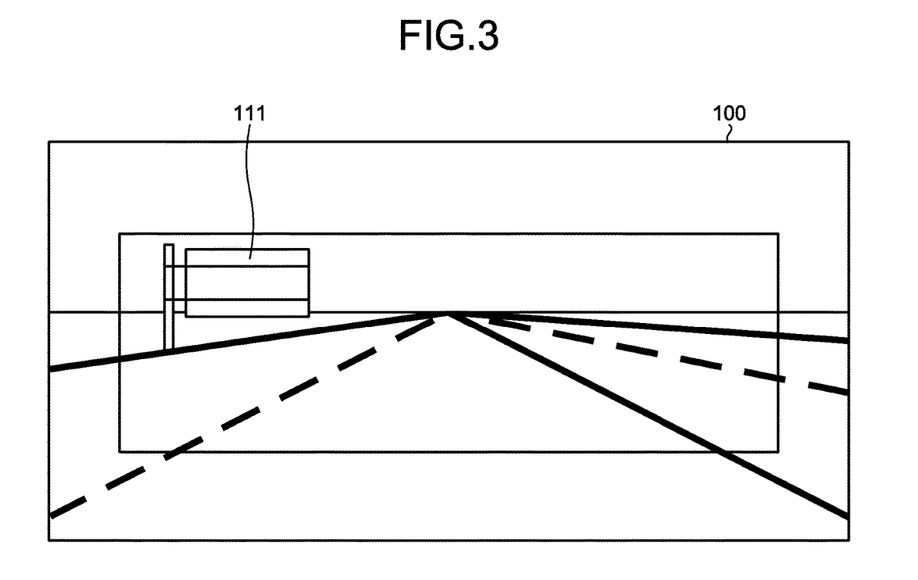
FIG. 3 is a diagram illustrating an example of rear video data captured by a rear view camera of the vehicle display system according to the first embodiment.

The rear view camera 20 is provided at a rear of a vehicle while facing back, and captures a rear side of the vehicle. For example, with respect to the rear view camera 20, an angle of view in a horizontal direction is 90° to 180°, and an angle of view in a vertical direction is 45° to 90°. For example, the rear view camera 20 captures rear video data (first video data) 100 as illustrated in FIG. 3. FIG. 3 is a diagram illustrating an example of the rear video data captured by the rear view camera of the vehicle display system according to the first embodiment. The rear view camera 20 is capable of capturing a video of a range which is wider than the range to be displayed on the rear view monitor 60, and clips a range that allows a driver of the vehicle to appropriately perceive a rear side by using the rear view monitor 60 to display the range on the rear view monitor 60. The rear view camera 20 outputs the captured rear video data 100 to a video data acquisition unit 11 of the vehicle display controller 10.

Referring back to FIGS. 1 and 2, the right side camera 30 is provided on a right side of the vehicle while facing back, and captures the right side of the vehicle. The right side camera 30 captures a range which is to be checked on the right-side view monitor 70. For example, with respect to the right side camera 30, an angle of view in the horizontal direction is 15° to 45°, and an angle of view in the vertical direction is 15° to 45°. The angle of the right side camera 30 can be freely changed. The right side camera 30 outputs the captured video to the video data acquisition unit 11 of the vehicle display controller 10.

The left side camera 40 is provided on a left side of the vehicle while facing back, and captures the left side of the vehicle. The left side camera 40 captures a range which is to be checked on the left-side view monitor 80. For example, with respect to the left side camera 40, an angle of view in the horizontal direction is 15° to 45°, and an angle of view in the vertical direction is 15° to 45°. The angle of the left side camera 40 can be freely changed. The left side camera 40 outputs the captured video to the video data acquisition unit 11 of the vehicle display controller 10.

Figure 4:
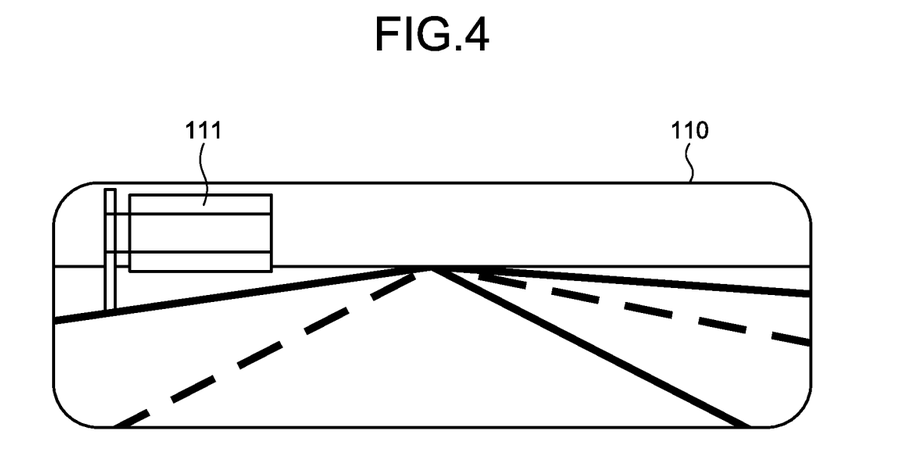
FIG. 4 is a diagram illustrating an example of a video displayed on a rear view monitor of the vehicle display system according to the first embodiment.

The rear view monitor 60 is an electronic room mirror, for example. In a case where the rear view monitor 60 is used as the electronic room mirror, presence/absence of a half mirror for checking a rear side by optical reflection does not matter. For example, the rear view monitor 60 is a display such as a liquid crystal display (LCD) or an organic electroluminescence (EL) display. The rear view monitor 60 displays a rear video of the vehicle based on a video signal output from a display controller 17 of the vehicle display controller 10. Specifically, the rear view monitor 60 displays the rear video as illustrated in FIG. 4. FIG. 4 is a diagram illustrating an example of a video displayed on the rear view monitor of the vehicle display system according to the first embodiment. The rear view monitor 60 is provided at a position that can be easily viewed by a driver. In the present embodiment, the rear view monitor 60 is provided at an upper portion of a windshield, and at a center in a vehicle width direction. Alternatively, the rear view monitor 60 may be embedded in a dashboard or in a headliner.

A size and a shape of the rear view monitor 60 are not particularly specified. For example, the rear view monitor 60 may have the same size and shape as a conventional optical room mirror. Alternatively, for example, the rear view monitor 60 may be wider in the vehicle width direction compared to a conventional optical room mirror. Alternatively, for example, the rear view monitor 60 may be wider in the vertical direction compared to a conventional optical room mirror.

Referring back to FIGS. 1 and 2, the right-side view monitor 70 is a display such as a liquid crystal display or an organic EL display, for example. The right-side view monitor 70 displays a right-side rear video of the vehicle based on a video signal output from the display controller 17 of the vehicle display controller 10. The right-side view monitor 70 is provided at a position that can be easily viewed by a driver. In the present embodiment, the right-side view monitor 70 is provided on a right side of the dashboard in the vehicle width direction.

The left-side view monitor 80 is a display such as a liquid crystal display or an organic EL display, for example. The left-side view monitor 80 displays a left-side rear video of the vehicle based on a video signal output from the display controller 17 of the vehicle display controller 10. The left-side view monitor 80 is provided at a position that can be easily viewed by a driver. In the present embodiment, the left-side view monitor 80 is provided on a left side of the dashboard in the vehicle width direction.

For example, the vehicle display controller 10 is an arithmetic processing device configured of a central processing unit (CPU) and the like. The vehicle display controller 10 executes commands included in programs stored in a storage, not illustrated. The vehicle display controller 10 includes the video data acquisition unit 11, a clipping processor 12, a positional relationship acquisition unit 13, a guide sign information acquisition unit 14, a recognition processor 15, a combination processor 16, and a display controller 17.

The video data acquisition unit 11 acquires videos capturing the rear side, the right side and the left side of the vehicle. For example, the video data that is acquired by the video data acquisition unit 11 is video data of continuous images at 60 frames per second. The video data acquisition unit 11 acquires the rear video data 100 output by the rear view camera 20, right side video data output by the right side camera 30, and left side video data output by the left side camera 40. The video data acquisition unit 11 outputs the acquired video data to the clipping processor 12.

The clipping processor 12 clips, from the right side video data, right side video data for display which is adjusted to the right-side view monitor 70. The clipping processor 12 clips, from the left side video data, left side video data for display which is adjusted to the left-side view monitor 80. The clipping processor 12 outputs the right side video data for display and the left side video data for display, obtained by clipping, to the display controller 17.

The clipping processor 12 clips, from the rear video data 100, rear video data 110 for display which is adjusted to the rear view monitor 60. A range to be clipped in the rear video data 100 is registered and stored in advance. In the present embodiment, a center portion of the rear video data 100 is clipped. The clipping processor 12 outputs the clipped rear video data 110 for display to the recognition processor 15 and the combination processor 16.

The positional relationship acquisition unit 13 acquires a positional relationship between a guide sign installed on a traveling course and the vehicle. In the present embodiment, the positional relationship acquisition unit 13 acquires the positional relationship between the guide sign and the vehicle based on navigation information acquired from a navigation system. The positional relationship between the guide sign and the vehicle includes information by which whether the vehicle has passed the guide sign or not can be determined.

The navigation information includes map information including the traveling course of the vehicle, guide sign information indicating installation position information and indications of the guide signs installed on the traveling course, and current position information of the vehicle. The installation position information of the guide signs includes installation orientations of the guide signs relative to the traveling course. The indication on the guide sign includes text information, figure information, and color information of the guide sign. The indication on the guide sign may be image data representing the guide sign.

The guide sign information acquisition unit 14 acquires the installation position information and the indication of the guide sign. In the present embodiment, the guide sign information acquisition unit 14 acquires the installation position information and the indication of the guide sign based on the navigation information acquired from the navigation system. In the present embodiment, the guide sign information acquisition unit 14 acquires image data representing the guide sign.

The recognition processor 15 recognizes a back surface 111 of a passed sign from the rear video data 110 for display acquired by the video data acquisition unit 11, after the positional relationship between the guide sign and the vehicle acquired by the positional relationship acquisition unit 13 indicates that the vehicle has passed the guide sign. More specifically, after it is determined that the vehicle has passed the guide sign, the recognition processor 15 performs image processing on the rear video data 110 for display acquired by the video data acquisition unit 11 and subjected to a clipping process, to recognize the back surface 111 of the guide sign installed at a position corresponding to the installation position information of the guide sign acquired by the positional relationship acquisition unit 13. Alternatively, for example, the recognition processor 15 may recognize, after the vehicle is determined to have passed the guide sign, the back surface 111 of the passed guide sign which is rectangular or circular shape of gray or silver color and which is installed above the road surface, by performing image processing on the rear video data 110 for display. Alternatively, for example, the recognition processor 15 may recognize, after the vehicle is determined to have passed the guide sign, a shape which is similar to the passed guide sign and which is installed above the road surface, as the back surface 111 of the guide sign, by performing image processing on the rear video data 110 for display. Alternatively, the recognition processor 15 may refer to a recognition dictionary which stores patterns of the back surface 111 of the guide sign, after the vehicle is determined to have passed the guide sign, to recognize the back surface 111 of the guide sign by pattern matching performed with respect to the rear video data 110 for display.

The combination processor 16 generates, with respect to the rear video data 110 for display, combined video data 120 combining an indication on the guide sign acquired by the guide sign information acquisition unit 14 with the back surface 111 of the guide sign recognized by the recognition processor 15. In the present embodiment, the combination processor 16 generates the combined video data 120 combining image data 121 of the guide sign acquired by the guide sign information acquisition unit 14 with the back surface 111 of the guide sign in the rear video data 110 for display. The combination processor 16 pastes the image data 121 of the guide sign acquired by the guide sign information acquisition unit 14 by adjusting the size of the image data 121 to a size recognized as the back surface 111 of the guide sign in the rear video data 110 for display. The combination processor 16 pastes the image data 121 of the guide sign acquired by the guide sign information acquisition unit 14 by changing the size of the image data 121 according to a change in a distance between the vehicle and the guide sign, or in other words, according to a change in the size recognized as the back surface 111 of the guide sign. The combination processor 16 outputs the combined video data 120 to the display controller 17.

The combination processor 16 may combine an erect image of the image data 121 of the guide sign. For example, in a case where the guide sign is installed at a position indicating a branch point in route guide information, the combination processor 16 may combine the erect image of the image data 121 of the guide sign. For example, in a case of the guide sign installed on an unfamiliar road or a road that is used for the first time, the combination processor 16 may combine the erect image of the image data 121 of the guide sign. For example, in a case where an amount of information of the indication on the guide sign is at or above a threshold, the combination processor 16 may combine the erect image of the image data 121 of the guide sign. For example, in a case where the indication on the guide sign includes a character with low readability, the combination processor 16 may combine the erect image of the image data 121 of the guide sign. For example, in a case where the guide sign is a variable-message sign indicating congestion information, the combination processor 16 may combine the erect image of the image data 121 of the guide sign. In the present embodiment, the combination processor 16 combines the erect image of the image data 121 of the guide sign.

Alternatively, the combination processor 16 may combine a mirror image of the image data 121 of the guide sign. For example, in a case where the guide sign is other than those installed at a position indicating a branch point in route guide information, the combination processor 16 may combine the mirror image of the image data 121 of the guide sign. For example, in a case of the guide sign that is installed on a road that is repeatedly used, the combination processor 16 may combine the mirror image of the image data 121 of the guide sign. For example, in a case where an amount of information of the indication on the guide sign is at or below a threshold, the combination processor 16 may combine the mirror image of the image data 121 of the guide sign. For example, in a case where the indication on the guide sign does not include a character with low readability, the combination processor 16 may combine the mirror image of the image data 121 of the guide sign. For example, in a case where the guide sign is a regulatory sign other than a guide sign, the combination processor 16 may combine the mirror image of the image data 121 of the guide sign.

The combination processor 16 may generate, with respect to the rear video data 110 for display, combined video data 120 emphasizing and combining the indication on the guide sign acquired by the guide sign information acquisition unit 14 with the back surface 111 of the guide sign recognized by the recognition processor 15. For example, changing a color or brightness of the indication on the guide sign to be combined may be performed for emphasizing and combining the indication on the guide sign. For example, surrounding an outer periphery of the indication on the guide sign to be combined with a frame may be performed for emphasizing and combining the indication on the guide sign.

Figure 5:
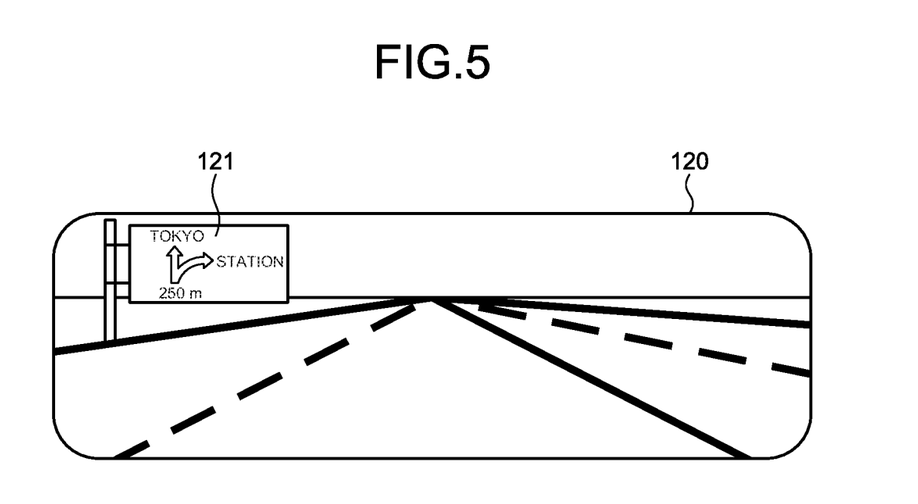
FIG. 5 is a diagram illustrating another example of the video displayed on the rear view monitor of the vehicle display system according to the first embodiment.

For example, the combination processor 16 generates the combined video data 120 that is combined as illustrated in FIG. 5. FIG. 5 is a diagram illustrating another example of the video displayed on the rear view monitor of the vehicle display system according to the first embodiment. In the combined video data 120, the image data 121 of the guide sign is pasted on the back surface 111 of the guide sign in the rear video data 110 for display. The size of the image data 121 of the guide sign is about the same as the size of the back surface 111 of the guide sign. The image data 121 of the guide sign is combined as an erect image.

The display controller 17 causes the rear view monitor 60 to display the rear video data 110 for display or the combined video data 120 combined by the combination processor 16. The display controller 17 causes the rear view monitor 60 to display the combined video data 120 for a predetermined time after the back surface 111 of the guide sign is recognized by the recognition processor 15. In other words, the display controller 17 causes the rear view monitor 60 to display the rear video data 110 for display until a predetermined time has passed from recognition of the back surface 111 of the guide sign by the recognition processor 15.

The display controller 17 causes the right-side view monitor 70 to display the right side video data for display. The display controller 17 causes the left-side view monitor 80 to display the left side video data for display.

Figure 6:
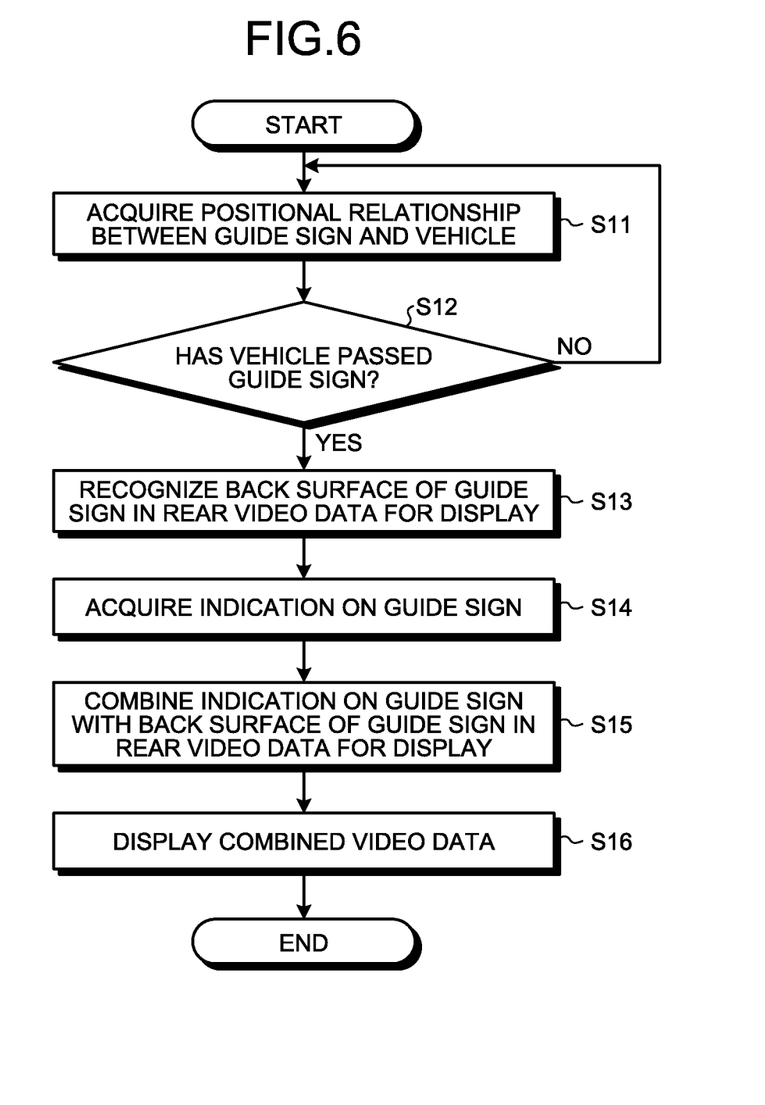
FIG. 6 is a flowchart illustrating a flow of processing by a vehicle display controller of the vehicle display system according to the first embodiment.

Next, information processing by the vehicle display controller 10 will be described with reference to FIG. 6. FIG. 6 is a flowchart illustrating a flow of processing by the vehicle display controller of the vehicle display system according to the first embodiment.

It is assumed, with respect to the processing of the flowchart illustrated in FIG. 6, that during operation of the vehicle, the rear video data 110 for display is displayed on the rear view monitor 60. More specifically, the video data acquisition unit 11 acquires the rear video data 100 which is output by the rear view camera 20. Then, the clipping processor 12 clips the rear video data 110 for display from the rear video data 100. Then, the display controller 17 causes the rear view monitor 60 to display the rear video data 110 for display.

The vehicle display controller 10 acquires the positional relationship between the guide sign and the vehicle (step S11). More specifically, the vehicle display controller 10 acquires the positional relationship between the guide sign and the vehicle by the positional relationship acquisition unit 13, based on the navigation information acquired from the navigation system. The vehicle display controller 10 proceeds to step S12.

The vehicle display controller 10 determines whether the vehicle passed the guide sign or not (step S12). More specifically, the vehicle display controller 10 determines whether the vehicle passed the guide sign or not based on the positional relationship between the guide sign and the vehicle acquired by the positional relationship acquisition unit 13. When determining that the vehicle passed the guide sign (Yes in step S12), the vehicle display controller 10 proceeds to step S13. When determining that the vehicle has not passed the guide sign (No in step S12), the vehicle display controller 10 repeats the process in step S11.

In a case where the vehicle is determined to have passed the guide sign (Yes in step S12), the vehicle display controller 10 recognizes the back surface 111 of the guide sign in the rear video data 110 for display (step S13). More specifically, for example, the vehicle display controller 10 performs image processing on the rear video data 110 for display by the recognition processor 15, and recognizes the back surface 111 of the guide sign that is installed at a position corresponding to the installation position information of the guide sign acquired by the positional relationship acquisition unit 13. The vehicle display controller 10 proceeds to step S14.

The vehicle display controller 10 acquires an indication on the guide sign (step S14). More specifically, the vehicle display controller 10 acquires the installation position information and the indication of the guide sign by the guide sign information acquisition unit 14, based on the navigation information acquired from the navigation system. The vehicle display controller 10 proceeds to step S15.

The vehicle display controller 10 combines the indication on the guide sign with the back surface 111 of the guide sign in the rear video data 110 for display (step S15). More specifically, the vehicle display controller 10 generates combined video data 120 obtained by combining, by the combination processor 16, the image data 121 of the guide sign acquired by the guide sign information acquisition unit 14 with the back surface 111 of the guide sign in the rear video data 110 for display. The vehicle display controller 10 proceeds to step S16.

The vehicle display controller 10 displays the combined video data 120 obtained by combining (step S16). More specifically, the vehicle display controller 10 causes, by the display controller 17, the combined video data 120 to be displayed on the rear view monitor 60. Until a predetermined time has passed from the recognition of the back surface 111 of the guide sign by the recognition processor 15, the vehicle display controller 10 causes, by the display controller 17, the rear video data 110 for display to be displayed on the rear view monitor 60. The vehicle display controller 10 ends the processing.

In this manner, the vehicle display system 1 displays, on the rear view monitor 60, the combined video data 120 combining the image data 121 of the guide sign with the rear video data 110, after the vehicle has passed the guide sign. After step S16, the display of the combined video data 120 is continued until a predetermined time, such as 10 seconds, has elapsed from start of the display of the combined video data 120 on the rear view monitor 60, for example. Alternatively, for example, the display of the combined video data 120 is continued, after the display of the combined video data 120 on the rear view monitor 60 is started, until the positional relationship between the guide sign and the vehicle indicates a predetermined distance of 20 meters or more. The display of the combined video data 120 is continued, after display of the combined video data 120 on the rear view monitor 60 is started, until the size of the recognized back surface 111 of the guide sign is reduced to less than 50% at the time of the start of the display.

As described above, in the present embodiment, after the vehicle has passed the guide sign, the combined video data 120 combining the image data 121 of the guide sign with the back surface 111 of the guide sign in the rear video data 110 for display is generated. Then, in the present embodiment, the combined video data 120 is displayed on the rear view monitor 60. In this manner, in the present embodiment, the driver may check the image data 121 of the guide sign appropriately through the rear view monitor 60 after the vehicle has passed the guide sign.

In the present embodiment, the image data 121 of the guide sign is displayed on the rear view monitor 60 after the vehicle has passed the guide sign. Accordingly, when the driver unconsciously views the rear view monitor 60 to check the guide sign after the vehicle has passed the guide sign, the driver can check the image data 121 of the guide sign. In this manner, according to the present embodiment, the driver does not have to perform a touch panel operation or the like to check the passed guide sign.

In the present embodiment, the image data 121 of the guide sign is pasted by having the size thereof adjusted to the size recognized as the back surface 111 of the guide sign. In the present embodiment, the rear video data 110 for display is displayed at a part other than the back surface 111 of the guide sign. According to the present embodiment, the image data 121 of the guide sign may be combined without reducing the amount of information of the video data that is displayed on the rear view monitor 60 for checking of the rear side.

In the present embodiment, the image data 121 of the guide sign is pasted by having the size thereof changed according to a change in the size recognized as the back surface 111 of the guide sign. According to the present embodiment, a sense of discomfort which is caused by combining the image data 121 of the guide sign with the rear video data 110 may be reduced.

In the present embodiment, the visibility of the image data 121 of the guide sign may be increased by combining the erect image of the image data 121 of the guide sign with the rear video data 110. When the erect image of the image data 121 of the guide sign is combined, if the guide sign viewed before the vehicle has passed the guide sign is a sign indicating a destination, the destination direction of the guide sign that is checked on the rear view monitor 60 after the vehicle has passed the guide sign coincides with the destination direction of the guide sign viewed before the vehicle has passed the guide sign. Moreover, characters are easily readable.

In the present embodiment, by combining the mirror image of the image data 121 of the guide sign, a sense of discomfort which is caused by combining the image data 121 of the guide sign with the rear video data 110 may be reduced. Because the rear video data 110 for display is also a mirror image, when the mirror image of the image data 121 of the guide sign is combined, a sense of discomfort is reduced.

In the present embodiment, by generating the combined video data 120 with emphasizing and combining the image data 121 of the guide sign, the visibility of the image data 121 of the guide sign may be further increased. According to the present embodiment, the image data 121 of the guide sign can be easily distinguished from other imaged objects in the combined video data 120. Accordingly, for example, in a case where the image data 121 of the guide sign and the other guide sign installed for an opposite lane are displayed in the combined video data 120, the image data 121 of the guide sign may be easily checked.

In the present embodiment, a directional sign may be displayed as the guide sign. According to the present embodiment, the driver can check a surrounding situation more appropriately by checking the passed directional sign.

According to the present embodiment, the passed directional sign is displayed on the rear view monitor 60. According to the present embodiment, the passed directional sign is displayed on the rear view monitor 60, and a directional sign at an intersection to be crossed is displayed on a navigation device. According to the present embodiment, the passed directional sign and a directional sign to be passed may be easily distinguished from each other.

Second Embodiment

Figure 7:
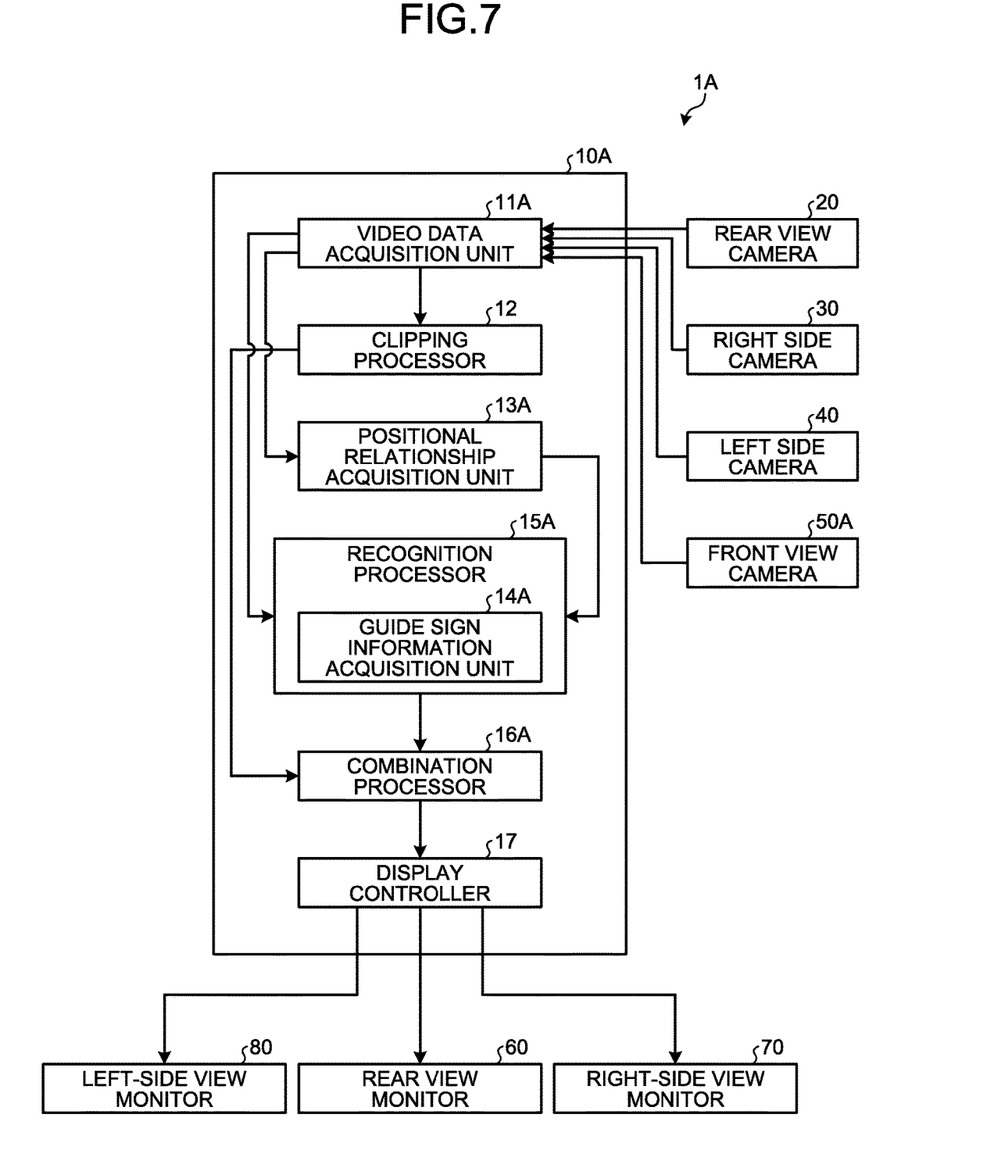
FIG. 7 is a block diagram illustrating an example configuration of a vehicle display system according to a second embodiment.
Figure 8:
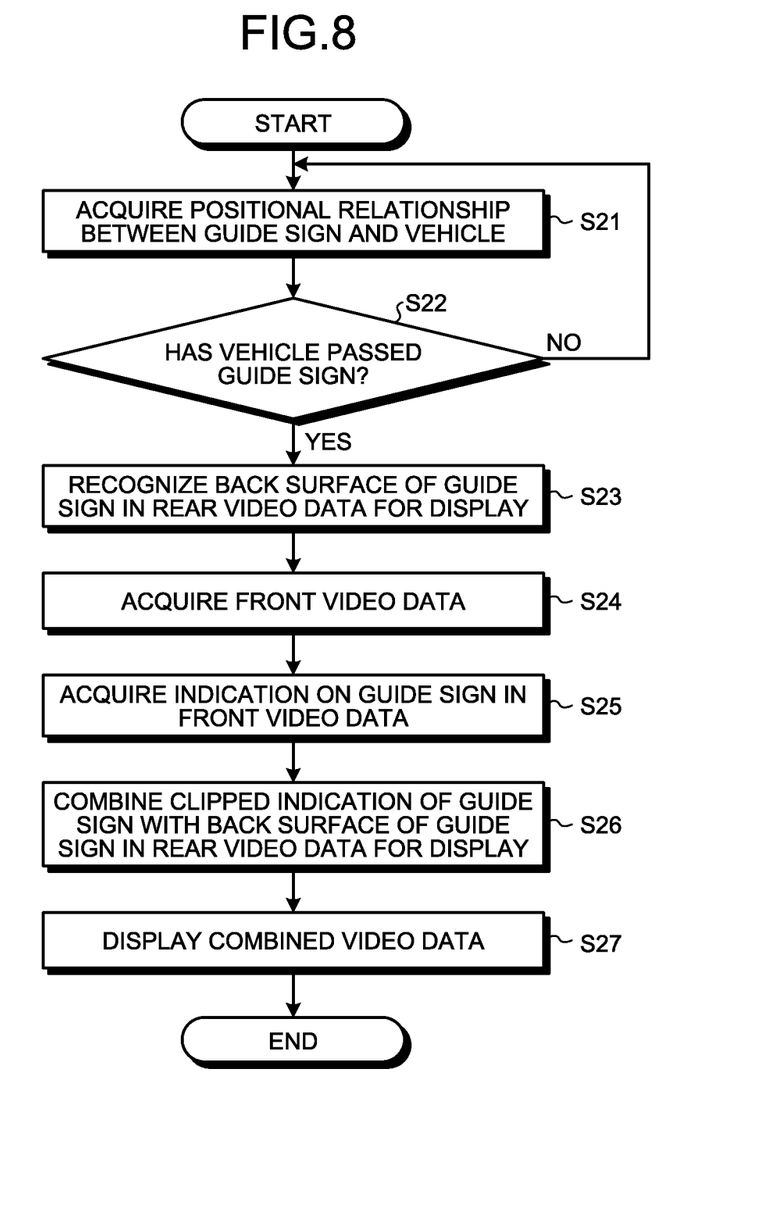
FIG. 8 is a flowchart illustrating a flow of processing by a vehicle display controller of the vehicle display system according to the second embodiment.
Figure 9:
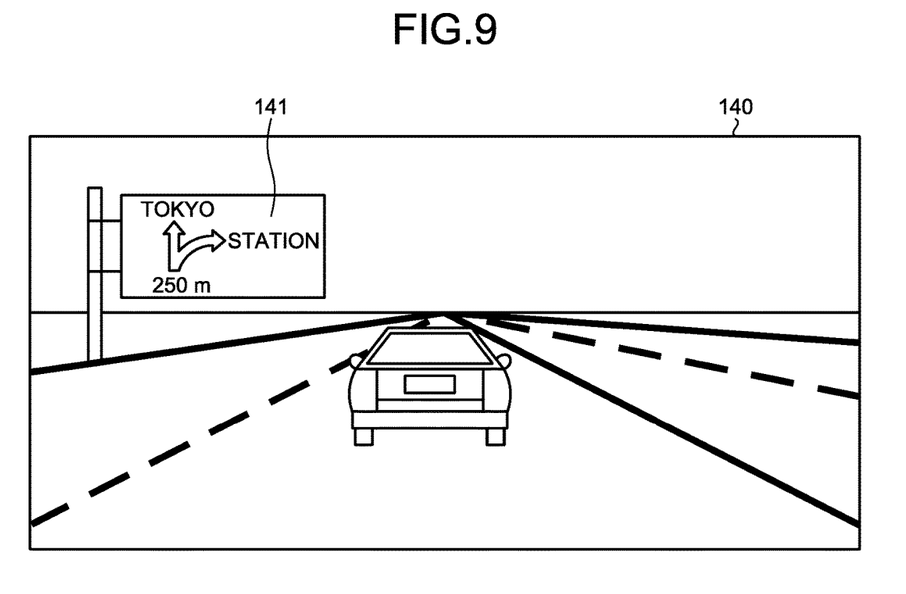
FIG. 9 is a diagram illustrating an example of front video data captured by a front view camera of the vehicle display system according to the second embodiment.

A vehicle display system 1A according to a present embodiment will be described with reference to FIGS. 7 to 9. FIG. 7 is a block diagram illustrating an example configuration of the vehicle display system according to the second embodiment. FIG. 8 is a flowchart illustrating a flow of processing by a vehicle display controller of the vehicle display system according to the second embodiment. FIG. 9 is a diagram illustrating an example of front video data captured by a front view camera of the vehicle display system according to the second embodiment. A basic configuration of the vehicle display system 1A according to the present embodiment is the same as that of the vehicle display system 1 of the first embodiment. In the following description, the same structural element as that of the vehicle display system 1 is denoted by the same or corresponding reference sign, and a detailed description thereof is omitted.

The vehicle display system 1A of the present embodiment includes a front view camera 50A, and is different from the vehicle display system 1 of the first embodiment with respect to information processing by a vehicle display controller 10A.

The front view camera 50A is provided at a front of a vehicle while facing front, and captures a front side of the vehicle. For example, with respect to the front view camera 50A, an angle of view in a horizontal direction is 90° to 180°, and an angle of view in a vertical direction is 45° to 90°. For example, the front view camera 50A captures front video data (second video data) 140 as illustrated in FIG. 9. The front view camera 50A outputs the captured front video data 140 to a video data acquisition unit 11A of the vehicle display controller 10A.

The video data acquisition unit 11A acquires the front video data 140 output by the front view camera 50A.

A positional relationship acquisition unit 13A acquires a positional relationship between a guide sign and the vehicle by performing image processing on the front video data 140 acquired by the video data acquisition unit 11A and the rear video data 110 for display. More specifically, the positional relationship acquisition unit 13A performs image processing on the front video data 140 and the rear video data 110 for display, and in a case where the guide sign having a similar shape becomes recognizable in the rear video data 110 for display after the guide sign can no longer be recognized in the front video data 140, the positional relationship acquisition unit 13A acquires information indicating that the vehicle has passed the guide sign.

A recognition processor 15A performs the image processing on the front video data 140 acquired by the video data acquisition unit 11A, and recognizes image data 141 of the guide sign. The recognition processor 15A having such a function functions as a guide sign information acquisition unit 14A.

The recognition processor 15A performs the image processing on the front video data 140 and the rear video data 110 for display, and in a case where the guide sign having the similar shape becomes recognizable in the rear video data 110 for display after the guide sign can no longer be recognized in the front video data 140, the recognition processor 15A recognizes a back surface 111 of the guide sign of the same recognized guide sign.

A combination processor 16A generates combined video data combining the image data 141 of the guide sign acquired by the recognition processor 15A as the guide sign information acquisition unit 14A with the back surface 111 of the guide sign in the rear video data 110 for display.

The display controller 17 causes the combined video data combined by the combination processor 16A to be displayed on the rear view monitor 60.

Information processing by the vehicle display controller 10A will be described. Processes in step S22, step S23, and step S27 in the flowchart illustrated in FIG. 8 are the same as the processes in step S12, step S13, and step S16 in the flowchart illustrated in FIG. 6.

The vehicle display controller 10A performs, by the positional relationship acquisition unit 13A, the image processing on the front video data 140 acquired by the video data acquisition unit 11A, and acquires the positional relationship between the guide sign and the vehicle (step S21). The vehicle display controller 10A proceeds to step S22.

The vehicle display controller 10A acquires, by the video data acquisition unit 11A, the front video data 140 output by the front view camera 50A (step S24). The vehicle display controller 10A proceeds to step S25.

The vehicle display controller 10A performs, by the recognition processor 15A, the image processing on the front video data 140, and acquires the image data 141 of the guide sign as the indication on the guide sign (step S25). The vehicle display controller 10A proceeds to step S26.

The vehicle display controller 10A combines the clipped image data 141 of the guide sign with the back surface 111 of the guide sign in the rear video data 110 for display (step S26). The vehicle display controller 10A proceeds to step S27.

In this manner, after the vehicle has passed the guide sign, the vehicle display system 1A displays, on the rear view monitor 60, the combined video data that is obtained by combining the image data 141 of the guide sign clipped from the front video data 140 with the rear video data 110.

As described above, in the present embodiment, after the vehicle has passed the guide sign, the combined video data obtained by combining the image data 141 of the guide sign clipped from the front video data 140 with the back surface 111 of the guide sign in the rear video data 110 for display is generated. In this manner, in the present embodiment, the driver can check the indication on the guide sign appropriately through the rear view monitor 60 after the vehicle has passed the guide sign by the image data 141 of the guide sign clipped from the front video data 140.

Third Embodiment

Figure 10:
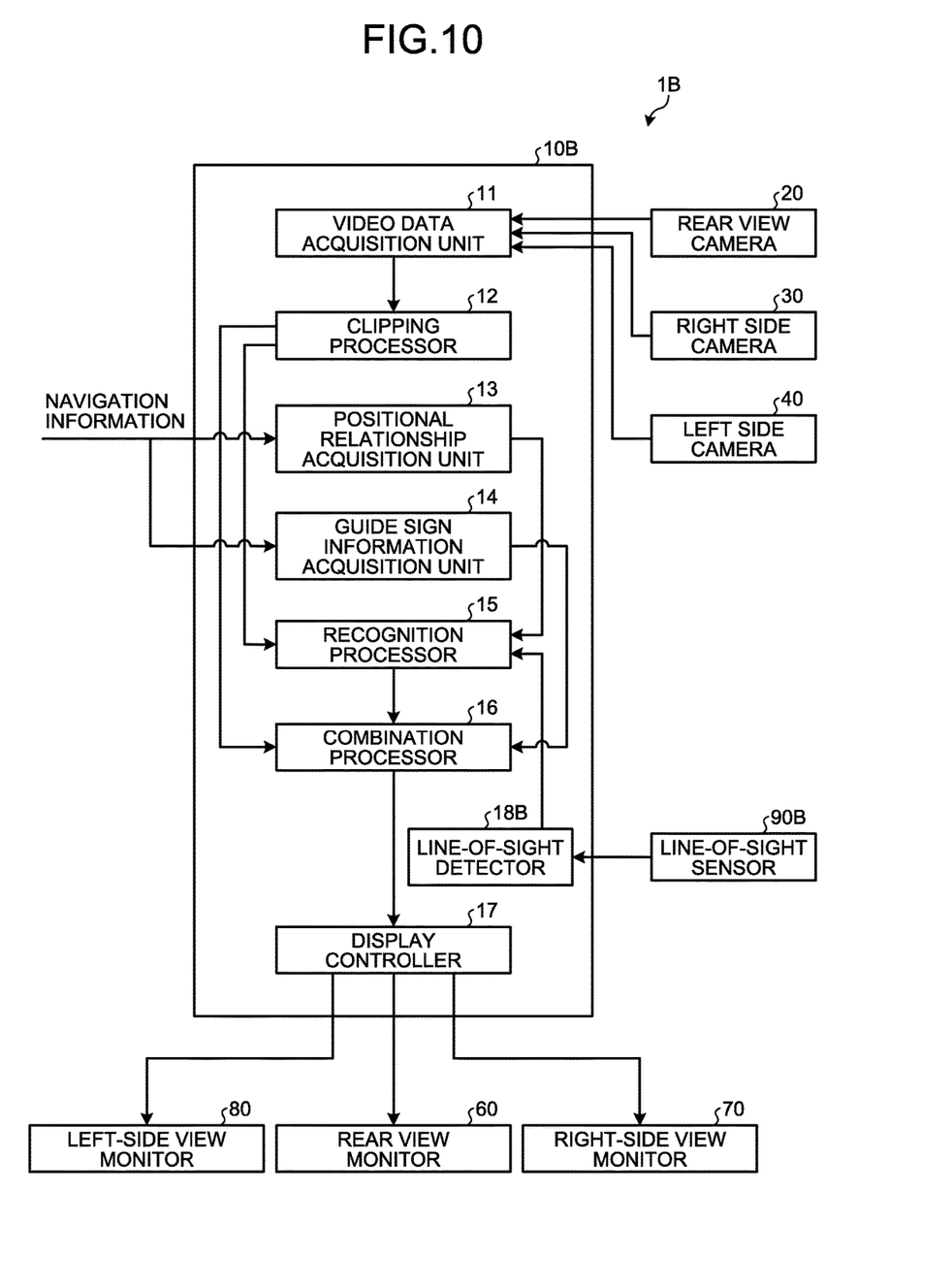
FIG. 10 is a block diagram illustrating an example configuration of a vehicle display system according to a third embodiment.
Figure 11:
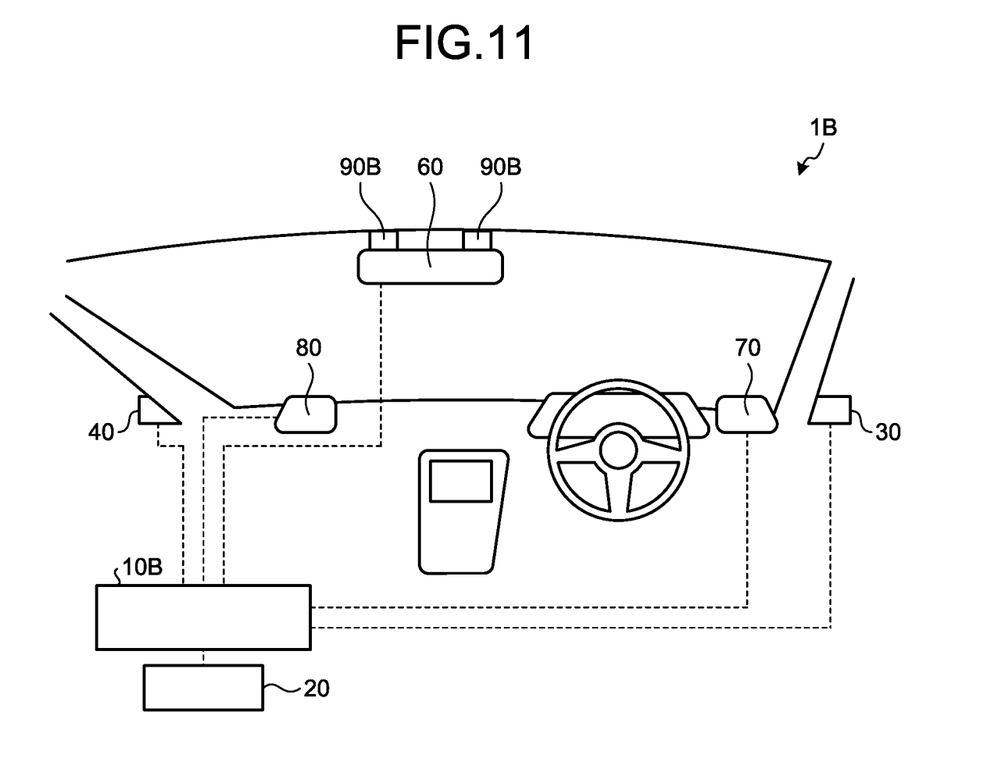
FIG. 11 is a schematic diagram illustrating an example configuration of the vehicle display system according to the third embodiment.
Figure 12:
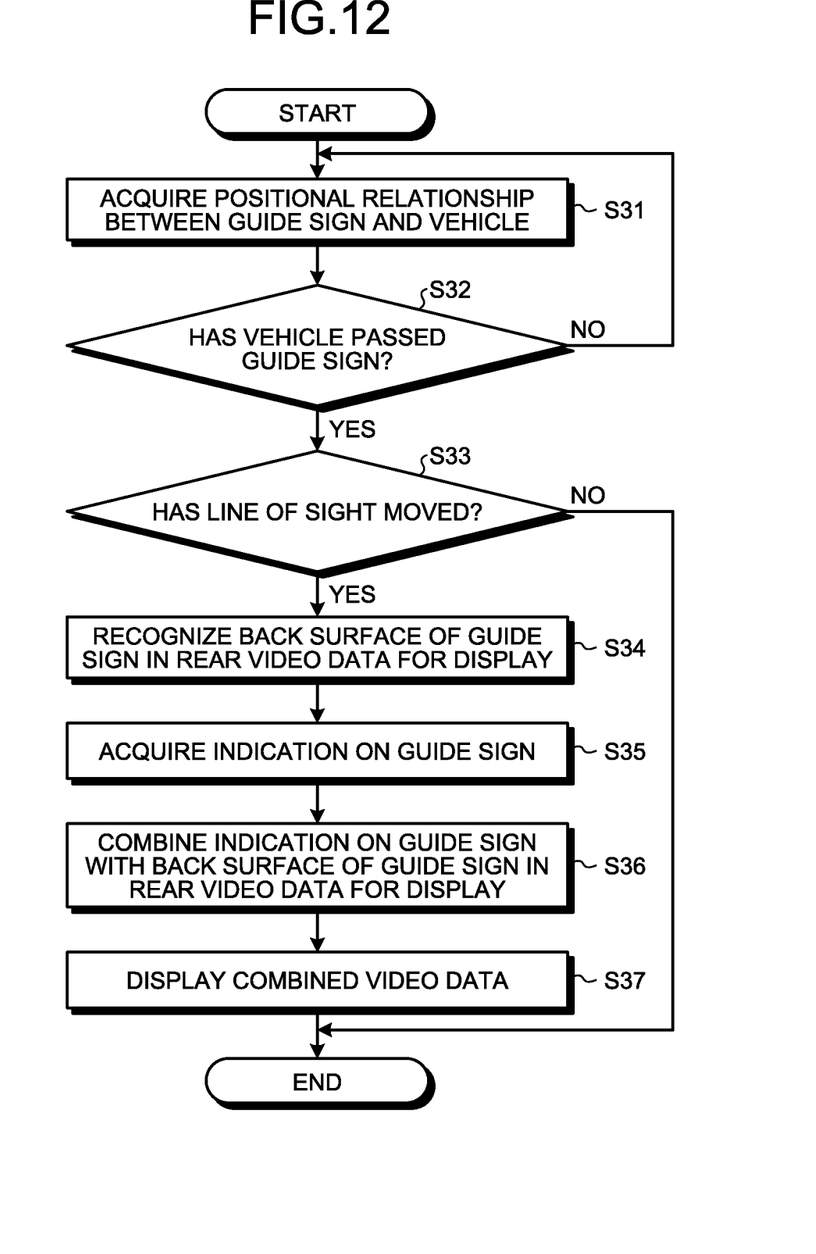
FIG. 12 is a flowchart illustrating a flow of processing by a vehicle display controller of the vehicle display system according to the third embodiment.

A vehicle display system 1B according to a present embodiment will be described with reference to FIGS. 10 to 12. FIG. 10 is a block diagram illustrating an example configuration of the vehicle display system according to the third embodiment. FIG. 11 is a schematic diagram illustrating an example configuration of the vehicle display system according to the third embodiment. FIG. 12 is a flowchart illustrating a flow of processing by a vehicle display controller of the vehicle display system according to the third embodiment. A basic configuration of the vehicle display system 1B according to the present embodiment is the same as that of the vehicle display system 1 of the first embodiment. The vehicle display system 1B includes a line-of-sight sensor 90B, and is different from the vehicle display system 1 of the first embodiment with respect to information processing by a vehicle display controller 10B.

The line-of-sight sensor 90B detects a line of sight of a driver. The line-of-sight sensor 90B is provided near the rear view monitor 60 while facing a driver's seat. In the present embodiment, the line-of-sight sensor 90B is provided on an upper side of the rear view monitor 60. For example, the line-of-sight sensor 90B includes a pair of infrared cameras and an infrared light emitter configured of a plurality of infrared LEDs. In the present embodiment, the line-of-sight sensor 90B radiates infrared light in a direction of a face of the driver by the infrared light emitter, and captures video by the pair of infrared cameras. Whether the line of sight of the driver faces toward the rear view monitor 60 or not may be determined with the captured video captured by the infrared cameras, based on a pupil and a position of corneal reflection of the driver. The line-of-sight sensor 90B may be another component having the same function. The line-of-sight sensor 90B outputs a detection result to a line-of-sight detector 18B.

After the vehicle has passed the guide sign, the vehicle display controller 10B displays, on the rear view monitor 60, the combined video data 120 that is obtained by combining the indication on the guide sign with the rear video data 110 when the line of sight of the driver is facing the rear view monitor 60.

The line-of-sight detector 18B detects whether the line of sight of the driver is facing the rear view monitor 60 or not, based on the detection result of the line-of-sight sensor 90B. More specifically, the line-of-sight detector 18B detects the pupil and the position of corneal reflection of the driver from the captured video of the infrared camera, and determines whether the line of sight of the driver is facing the rear view monitor 60 or not. The line-of-sight detector 18B outputs the detection result to the recognition processor 15.

Information processing by the vehicle display controller 10B will be described. Processes in step S31, step S32, and step S34 to step S37 in the flowchart illustrated in FIG. 12 are the same as the processes in step S11, step S12, and step S13 to step S16 in the flowchart illustrated in FIG. 6.

The vehicle display controller 10B determines whether the line of sight has moved or not (step S33). More specifically, the vehicle display controller 10B determines, based on the detection result of the line-of-sight detector 18B, whether the line of sight of the driver has moved to the rear view monitor 60 or not. In a case of determining that the line of sight of the driver has moved to the rear view monitor 60 (Yes in step S33), the vehicle display controller 10B proceeds to step S34. In a case of determining that the line of sight of the driver has not moved to the rear view monitor 60 (No in step S33), the vehicle display controller 10B ends the processing.

In this manner, when the line of sight of the driver moves to the rear view monitor 60 after the vehicle has passed the guide sign, the vehicle display system 1B displays, on the rear view monitor 60, combined video data 120 that is obtained by combining the image data 121 of the guide sign with the rear video data 110.

As described above, in the present embodiment, after the vehicle has passed the guide sign, the combined video data 120 obtained by combining the image data 121 of the guide sign with the back surface 111 of the guide sign in the rear video data 110 for display is generated when the line of sight of the driver moves to the rear view monitor 60. Then, in the present embodiment, the combined video data 120 is displayed on the rear view monitor 60. In this manner, in the present embodiment, the driver can check the image data 121 of the guide sign appropriately through the rear view monitor 60 after the vehicle has passed the guide sign when the line of sight of the driver moves to the rear view monitor 60.

Each structural element of the vehicle display system 1 illustrated is a functional concept, and does not necessarily have to be physically configured in the illustrated manner. That is, a specific mode of each device is not limited to the illustrated mode, and each device may be wholly or partially distributed or integrated functionally or physically in arbitrary units, depending on a processing load, a use state or the like of the device.

Elements of the vehicle display system 1 are realized as software by programs loaded in a memory, for example. In the embodiments described above, functional blocks realized by cooperation of hardware and software are described. That is, the functional blocks may be realized in various modes such as in a hardware only or software only mode, or a combination of hardware and software.

The structural elements described above include those that are easily conceivable by those skilled in the art, and those that are substantially the same. Furthermore, the elements described above may be combined as appropriate.

Various omissions, replacements and modifications can be made within the scope of the present application.

The right-side view monitor 70 and the left-side view monitor 80 are provided, but conventional optical right side mirror and left side mirror may be provided instead.

At the time of generating the combined video data 120, the vehicle display controller 10 may reduce the amount of information of guide signs for an opposite lane displayed on the rear video data 110 for display. The reducing of the amount of information comprises making color of indication on the guide sign lighter, or reducing brightness of the indication thereof, for example. Distinguishability between the guide signs for the opposite lane and the indication on the combined guide sign in the combined video data 120 may thereby be increased.

In the embodiments described above, the vehicle display controller 10 is described to display, on the rear view monitor 60, after the vehicle has passed the guide sign, the combined video data 120 that is obtained by combining the indication on the guide sign with the rear video data 110, but not limited thereto. The vehicle display controller 10 may alternatively display, on the right-side view monitor 70 and the left-side view monitor 80, after the vehicle has passed the guide sign, combined video data for a right side and combined video data for a left side, both obtained by combining the indication on the guide sign with video data for the right side and the left side.

The present application achieves an effect that an indication on a guide sign can be appropriately checked after the guide sign is passed.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display controller comprising:
   a video data acquisition unit configured to acquire first video data obtained by capturing a rear side of a vehicle;
   a positional relationship acquisition unit configured to acquire a positional relationship between a guide sign on a traveling course of the vehicle and the vehicle;
   a guide sign information acquisition unit configured to acquire an indication on the guide sign;
   a recognition processor configured to recognize, after the positional relationship between the guide sign and the vehicle acquired by the positional relationship acquisition unit indicates that the vehicle has passed the guide sign, a back surface of the passed guide sign in the first video data;
   a combination processor configured to generate, with respect to the first video data, a combined video by combining the indication on the guide sign acquired by the guide sign information acquisition unit with the back surface of the passed guide sign recognized by the recognition processor; and
   a display controller configured to cause the combined video combined by the combination processor to be displayed on a display that is used to check the rear side of the vehicle.

2. The vehicle display controller according to claim 1, wherein
   the video data acquisition unit is further configured to acquire second video data obtained by capturing a traveling direction of the vehicle, the recognition processor is further configured to function as the guide sign information acquisition unit by recognizing the guide sign in the second video data, and the combination processor is further configured to generate the combined video by combining the guide sign that is recognized and clipped by the guide sign information acquisition unit in the second video data with the back surface of the guide sign in the first video data recognized by the recognition processor.

3. The vehicle display controller according to claim 1, wherein the combination processor is further configured to paste the indication on the guide sign or the guide sign by adjusting a size of the indication on the guide sign or the guide sign to a size of the back surface of the guide sign recognized by the recognition processor.

4. The vehicle display controller according to claim 1, wherein the guide sign is a directional sign.

5. The vehicle display controller according to claim 1, wherein the combination processor is further configured to combine the indication on the guide sign or the guide sign in a form of a mirror image with the back surface of the guide sign recognized by the recognition processor.

6. The vehicle display controller according to claim 1, wherein the display controller is further configured to cause the combined video generated by the combination processor to be displayed on a display that is used as an electronic mirror for checking the rear side of the vehicle.

7. The vehicle display controller according to claim 1, wherein the display controller is further configured to cause the first video data to be displayed on the display, and also cause the combined video to be displayed for a predetermined time after the back surface of the guide sign is recognized by the recognition processor.

8. A vehicle display system comprising:
the vehicle display controller according to claim 1; and
at least one of the display and a imager configured to capture the rear side of the vehicle.

9. A vehicle display control method comprising:
acquiring first video data obtained by capturing a rear side of a vehicle;
acquiring a positional relationship between a guide sign on a traveling course of the vehicle and the vehicle;
acquiring an indication on the guide sign;
recognizing, after the acquired positional relationship between the guide sign and the vehicle indicates that the vehicle has passed the guide sign, a back surface of the passed guide sign in the first video data;
generating, with respect to the first video data, a combined video by combining the acquired indication on the guide sign with the recognized back surface of the guide sign; and
causing the combined video to be displayed on a display that is used to check the rear side of the vehicle.

10. A non-transitory storage medium that stores a program for causing a computer that operates as a vehicle display controller to execute:
acquiring first video data obtained by capturing a rear side of a vehicle;
acquiring a positional relationship between a guide sign on a traveling course of the vehicle and the vehicle;
acquiring an indication on the guide sign;
recognizing, after the acquired positional relationship between the guide sign and the vehicle indicates that the vehicle has passed the guide sign, a back surface of the passed guide sign in the first video data;
generating, with respect to the first video data, a combined video by combining the acquired indication on the guide sign with the recognized back surface of the guide sign; and
causing the combined video to be displayed on a display that is used to check the rear side of the vehicle.

* * * * *